United States Patent [19]

Modjeska et al.

[11] Patent Number: 5,390,362
[45] Date of Patent: Feb. 14, 1995

[54] USER EXTENDIBLE VOICE TRANSMISSION PAGING SYSTEM AND OPERATING METHOD

[75] Inventors: Robert G. Modjeska, Boynton Beach; Donald L. Branner, Coral Springs; Darrell Pfeffer, Delray Beach, all of Fla.

[73] Assignee: Motorola, Schaumburg, Ill.

[21] Appl. No.: 69,791

[22] Filed: Jun. 1, 1993

[51] Int. Cl.⁶ .............................................. H04Q 3/04
[52] U.S. Cl. ................... 455/38.1; 455/57.1; 340/825.44; 379/57; 379/88
[58] Field of Search ............... 455/38.1, 38.2, 54.1, 455/57.1; 379/57, 191, 192, 70, 79, 87, 88; 340/825.44

[56] References Cited

U.S. PATENT DOCUMENTS

| | | | |
|---|---|---|---|
| 4,811,379 | 3/1989 | Grandfield | 379/57 |
| 4,868,560 | 9/1989 | Oliwa et al. | 340/825.44 |
| 4,873,520 | 10/1989 | Fish et al. | 340/825.44 |
| 5,282,205 | 1/1994 | Kuznicki | 370/94.1 |

Primary Examiner—Curtis Kuntz
Assistant Examiner—Mary M. Lin
Attorney, Agent, or Firm—Gregg E. Rasor; John H. Moore

[57] ABSTRACT

A portable paging system communicates a paging message including a first portion having at least a selective call address (406) and a first activation code (407), and a second portion having a first segment (409) of an audio portion, to a selective call receiver (300). In the portable paging system, an input device (104) prompts an originator to request an extension of the second portion of the paging message, the extension including at least a second segment (410) of the audio portion. Upon receiving an affirmative talk time extension request from the originator, and if extending the second portion of the paging message does not exceed a predetermined number of extension requests or a predetermined total broadcast time allocated for the second portion of the paging message, a paging terminal controller (210) extends the second portion of the paging message.

13 Claims, 6 Drawing Sheets

USER EXTENDIBLE VOICE TRANSMISSION PAGING SYSTEM AND OPERATING METHOD

FIELD OF THE INVENTION

This invention relates in general to selective call messaging systems and more particularly to a voice capable selective call messaging system.

BACKGROUND OF THE INVENTION

Selective call communication (paging) systems typically comprise a radio frequency transmitter/encoder (base station) that is accessed locally or via a link to the Public Switched Telephone Network (PSTN), and a radio receiver (e.g., a selective call receiver or the like) that has at least one unique call address associated therewith. Operationally, the selective call receiver receives and decodes information transmitted from the base station, the information including an address and possibly a data or voice message. When the selective call receiver detects its address, it may alert a user and present message information received.

To implement messaging capability in a paging system, the address information referred to is encoded and subsequently transmitted using a protocol such as GSC (Motorola's Golay Sequential Code). This protocol is adapted to reliably communicate a selective call address to at least one selective call receiver as is well known to one of ordinary skill in the art of Paging systems. A typical selective call message may consist of an address signal if the message is a tone only message, an address signal and a data packet if the message is a data message, or an address signal and an audio transmission if the message is a voice message.

Present selective call messaging systems capable of voice transmission have a predetermined fixed time window following the address in which a voice message may be transmitted. This limitation is a function of the design of contemporary paging terminals and encoders as their hardware and associated firmware only supports a standard five to eight second voice transmission window. If the user's voice message exceeds the allocated voice transmission time, the message is abruptly cut-off. This Constraint relegates the message originator to sending another paging message if they desire to complete their voice communication. This method is not only inconvenient, but it is inefficient.

Consequently, what is needed is an apparatus and method that allows convenient origination and transmission of extended voice messages to a selective call receiver.

SUMMARY OF THE INVENTION

Briefly, according to the invention, there is provided a portable paging system capable of communicating a paging message to a selective call receiver, the paging message including a first portion comprising at least a selective call address and a first activation code, and a second portion comprising a first segment of an audio portion. The portable paging system comprises an input device for prompting an originator to request an extension of the second portion of the paging message, the extension including at least a second segment of the audio portion; and a paging terminal controller that extends the second portion of the paging message when the originator affirmatively requests the extension thereof and the extension of the second portion of the paging message does not exceed a predetermined number of extension requests; and does not exceed a predetermined total broadcast time allocated for the second portion of the paging message.

In a portable paging system capable of communicating a paging message to a selective call receiver, the paging message including a first portion comprising at least a selective call address and a first activation code, and a second portion comprising a first segment of an audio portion; a method for selectably extending the audio portion of the paging message comprises the steps of: prompting an originator to request an extension of the second portion of the paging message, the extension including at least a second segment of the audio portion; and extending the second portion of the paging message when the originator affirmatively requests the extension thereof and the extension of the second portion of the paging message does not exceed a predetermined number of extension requests; and does not exceed a predetermined total broadcast time allocated for the second portion of the paging message

DESCRIPTION OF A PREFERRED EMBODIMENT

Figure 1:
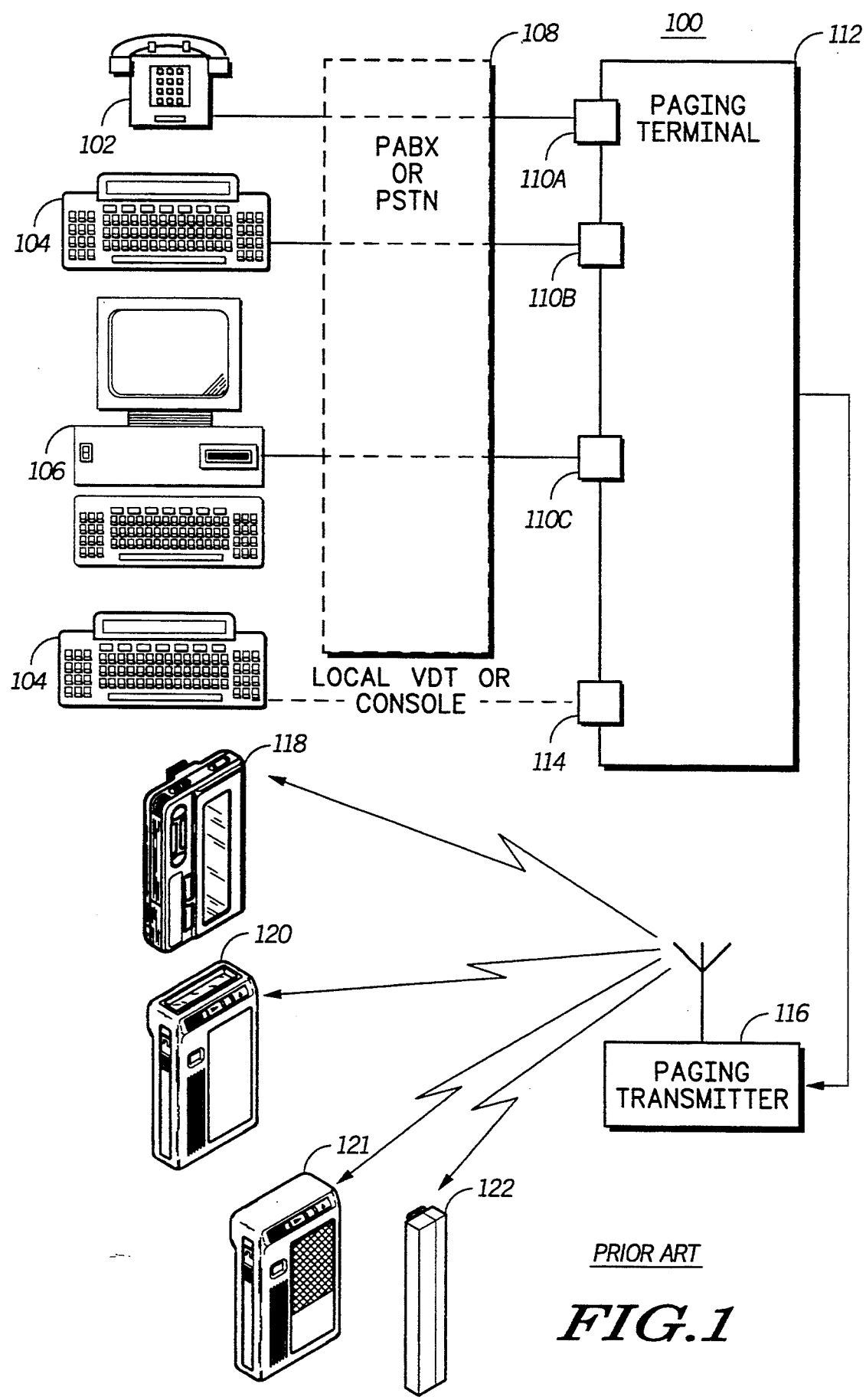
FIG. 1 is a block diagram of a selective call communication system configured for operation in accordance with the present invention.

Referring to FIG. 1, a communication system (e.g., a paging system 100) accepts a page request from several different sources (e.g., a telephone 102, a page entry terminal device 104, and a computer with modem 106). The page request is normally accepted through a public or a private telephone network 108, which couples the page request from one of the sources (i.e., callers) to an automatic telephone input (110A, 110B, or 110C) at a paging terminal 112. A dedicated input 114 at the paging terminal 112 can accept a page request from an input device such as a custom console that enables message origination, destination selection, information entry and communication, and response presentation via a display or the like. Such a console is embodied in the page entry terminal device 104 that may connect to the paging terminal 112 either directly or through the PSTN connection. Further dedicated inputs (not shown) may be associated with a telephone switchboard and message dispatch service that accepts page requests from a telephone caller and enters the page requests into the paging terminal 112 typically through a video display terminal, computer, or the like.

After accepting the page request, the paging terminal 112 encodes and transmits, through a conventional transmitter 116, a page to a selective call receiver (e.g., a pager). Conventional paging systems may convey information from a caller to a pager user through a plurality of message formats. These message formats are commonly referred to as message sources, each of which denotes a mode of data (e.g., characters, numbers, audio, graphics, or "just a beep") being sent to the pager. FIG. 1 illustrates a number of conventional selective call receivers that may convey information to the pager user through either an alphanumeric display message page 118, a numeric display message page 120, a voice message page 121, or a tone only page 122. In the latter case, the tone only page 122 (i.e., no message page), alerts (e.g., an audible beep), the user that a caller wants the pager user to respond by calling a prearranged telephone number, such as a receptionist telephone number.

A conventional selective call receiver commonly receives a page, alerts the pager wearer, and optionally presents the message information according to a message format that is mapped to a pager address on the paging system. The unique pager address typically represents the message format (e.g., alphanumeric, numeric, voice, or tone-only), supported by the selective call receiver. Therefore, by matching the unique pager address with the appropriately formatted message, a page with a specific message format may be effectively transmitted to the selective call receiver by the paging terminal 112.

Modern selective call receivers may be capable of receiving and presenting message information in a plurality of formats, typically using separate pager addresses mapped to the same selective call receiver. When more than one format is supported by a selective call receiver, there may be several unique sources (paging addresses) associated with the receiver that allow correct reception of different message formats. For example, one pager address may be mapped to a numeric display message format and a second pager address may be mapped to a voice message format. Therefore, information may be conveyed from a caller to the pager user in either numeric display message format or voice message format.

Hence, the aforementioned communication system 100 is capable of receiving message information in a plurality of formats. The message formats are mapped to unique pager addresses supported by the communication system. Where more than one pager address and message format pairs are mapped to the same selective call receiver, information may be conveyed from a caller to a pager user in a plurality of message formats (e.g., alphanumeric display, numeric display, and voice).

Figure 2:
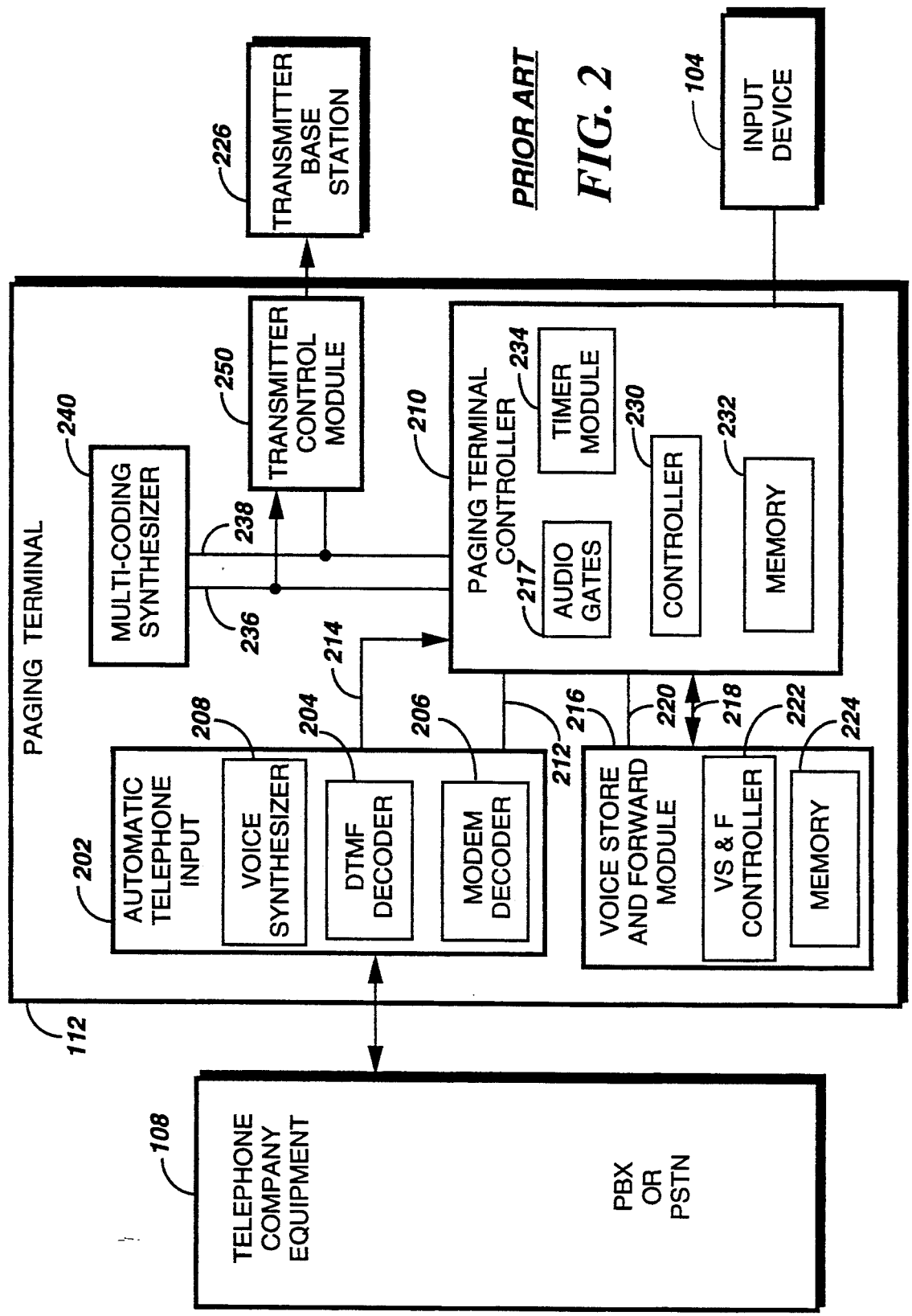
FIG. 2 is a block diagram of a paging terminal and input device in accordance with the preferred embodiment of the present invention.

Referring to FIG. 2, a block diagram of a communication system (e.g., a paging system) comprising a paging terminal 112 is shown in accordance with an embodiment of the present invention. The paging terminal 112 interfaces directly 114 to the input device 104 that enables message origination, destination selection, information entry and communication, and response presentation through a display or the like. Alternatively, the paging terminal 112 may interface with telephone company equipment 108 through at least one automatic telephone input 202. A caller may enter a page request into the communication system using conventional DTMF communication 204 or modem communication 206. A voice synthesizer 208 may present a synthesized voice at the telephone interface, and thereby prompt the caller through the page request entry process. Alternatively, the caller may be prompted by audio tones sent through the telephone interface.

The automatic telephone input 202 communicates the page request information to a paging terminal controller 210 through an input control bus 212 and optionally an input audio bus 214. The dedicated input 114 couples control and audio signals directly between the paging terminal controller 210 and the dedicated input device 104. The input audio bus 214 routes a voice message from the caller into the paging system, for systems capable of handling voice message pages. Since a paging channel and its associated transmitter 226 may not always be available to communicate the incoming page request immediately to a selective call receiver (not shown), the paging terminal controller 210 may temporarily transfer the voice message information to an optional voice store and forward (VS&F) module 216 using audio gates 217, a voice store and forward audio bus 218 and a voice store and forward control bus 220. The voice store and forward module 216 comprises a VS&F controller circuit 222 and associated memory 224 for storing the incoming voice messages and subsequently retrieving and playing them back as part of the voice message pages, under control of the paging terminal controller 210. The storing and retrieving process may be preferably done using a known linear predictive coding (LPC) or a continuously variable slope delta modulation (CVSD) algorithm in the voice store and forward module 216. In this way, the paging terminal 112 may optionally use the voice store and forward module 216 to integrate the arrival times of the incoming voice message page requests with the availability of the paging channel, thereby optimally utilizing the channel capacity.

The paging terminal controller 210 may comprise a controller circuit 230 and associated memory 232, such that an incoming page request may be accepted and stored into available memory 232 for subsequent transmission to a selective call receiver (e.g., as designated by a unique pager address and a message information format for the particular select call receiver). When a page request is received from a caller, the paging terminal controller 210 verifies the requested selective call address identifier and coupled message information format. By comparing the paging request information to a local database of valid pager addresses and message information formats, the paging terminal controller 210 is capable of instructing the automatic telephone input 202 for the required prompting to the caller. Additionally, the accepted page request information may be transferred from the automatic telephone input to the paging terminal controller 210 through the input control bus 212, and stored into a designated area of memory 232. The stored page information typically comprises a pager address. However, it may include a numeric display message or an alphanumeric display message, formatted to the requirement of the particular page request using known coding schemes (e.g., POCSAG and GOLAY sequential). In the event of a voice message page, as discussed earlier, the voice message may be stored into a designated area of voice store and forward memory 224, with the pager address and required linking information stored into the area of paging terminal controller memory 232, as may be necessary to subsequently construct the voice message page for transmission to a selective call receiver. Therefore, a selective call address identifier may be received and accepted by the paging terminal 112, and the corresponding data (or message) stored into a designated area of memory (e.g., either the VS&F memory 224 or the paging terminal controller memory 232), and subsequently transmitted to a selective call receiver subject to the availability of the paging channel.

A timer module 234 may be used by the paging terminal controller 210 to perform timed functions for the paging system. Many tasks within the paging terminal 112 require predetermined time intervals. For example, in accepting a selective call address identifier, typically a signal from a caller to terminate the paging request entry process may be either a particular information received from the caller or a predetermined inactivity time interval (e.g., a time interval with no communication detected from the caller).

Once a display message page (e.g., alphanumeric display message page or numeric display message page) is ready to be sent to a selective call receiver, a multi-coding synthesizer module 240 receives the pager address information and the formatted display message from the memory module 232 (e.g., typically through an output control bus 238). The display pager address information instructs the multi-coding synthesizer module 240 as to what pager address and type of pager encoding is needed (e.g., POCSAG or GOLAY sequential) to effectively transmit the display message page to the selective call receiver.

As can be appreciated by one of ordinary skill in the art, the preferred embodiment of the instant invention can be realized using any selective call signaling protocol capable of delivering data messages, not only the protocol used in this example. This flexibility allows for unlimited future expansion into alternative high speed, high efficiency signaling protocols.

The paging terminal controller 210 finally instructs the transmitter control module 250 (i.e., through the output control bus 238), to turn "on" the transmitter base station 226 and begin transmitting over the paging system channel. The multi-coding synthesizer module 240 is typically responsible for sending the encoded message information to the transmitter base station 226 (i.e., typically through an output audio bus 236 and through the transmitter control module 250), which broadcasts the message information over the paging system channel.

In the preferred embodiment of the present invention an abbreviated yet fully functional form of the paging terminal's electronics is integrated with a low power transmitter to yield a portable paging system that is capable of originating selective call messaging in the formats previously discussed. Message origination features are also integrated within the portable unit so that an external terminal (computer or the like) is not needed. Optionally, the portable paging system may include provisions for interconnecting to a conventional wide area paging system as discussed in reference to FIGS. 1 and 2. This flexibility allows the user to make use of the existing wide area infrastructure for conventional messaging while retaining the convenience of instant local or on-site paging through the portable paging system.

Figure 3:
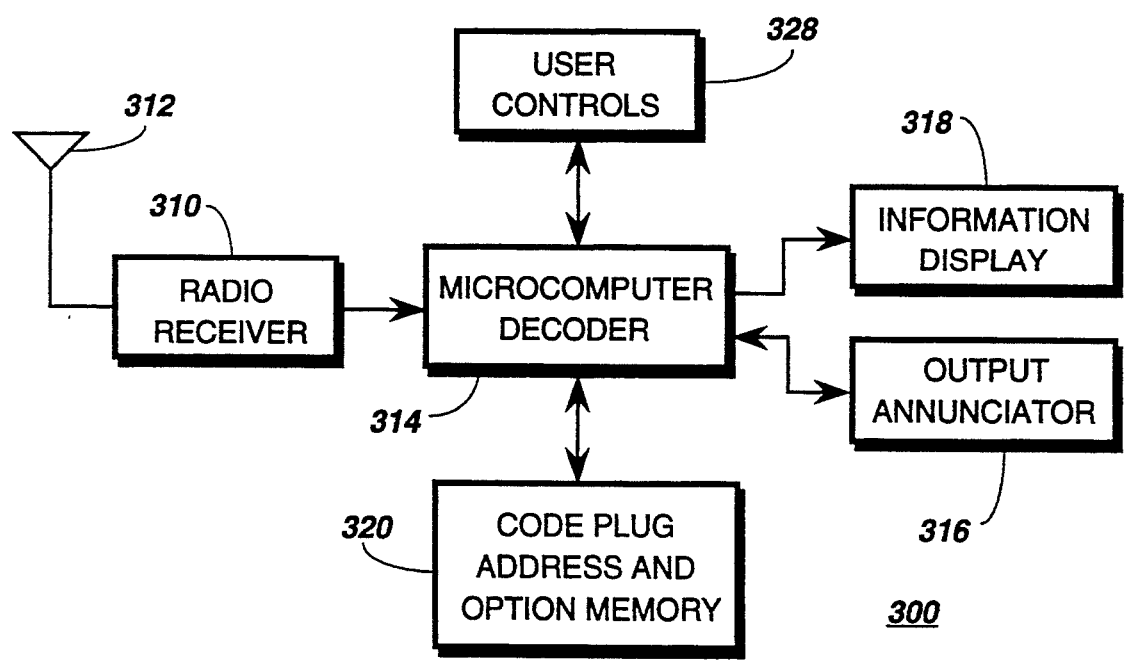
FIG. 3 illustrates a conventional selective call receiver configured for operation in accordance with the preferred embodiment of the present invention.

FIG. 3 is an electrical block diagram of a selective call receiver, e.g., a pager 300. It includes radio receiver circuitry 310 that receives signals via an antenna 312. The received signals include paging information. Selective call receivers can respond to transmitted information containing various combinations of tone, tone and voice, or data messages in a variety of modes. This information may be transmitted using several paging coding schemes and message formats.

The output of the radio receiver circuitry 310 is applied to a microcomputer decoder 314 that processes the information contained in the received signals, to decode and present any received message. As can be seen, the microcomputer decoder 314 communicates with an output annunciator 316, such as a transducer or speaker, to alert a user that a message has been received, with a display 318, such as a liquid crystal display (LCD), to present a message via the display 318, and with a code plug address and option memory 320 to retrieve predetermined address and function information. Normally, after a received address matches a predetermined address in the pager 300, the output annunciator 316 alerts the user that a message has been received, and in the case of a conventional voice message, the receiver operates to present the message to the user. The user can also activate user controls 328, such as buttons or switches, to invoke functions in the pager 300, and optionally to view the received message on the display 318 or re-play a received audio message as is the case when the pager has a voice storage function. The operation of a paging receiver of the general type shown in FIG. 3 is well known and is more fully described in U.S. Pat. No. 4,518,961, issued May 21, 1985, entitled "Universal Paging Device with Power Conservation," which is assigned to the same assignee as the present invention and is incorporated herein by reference.

Figure 4:
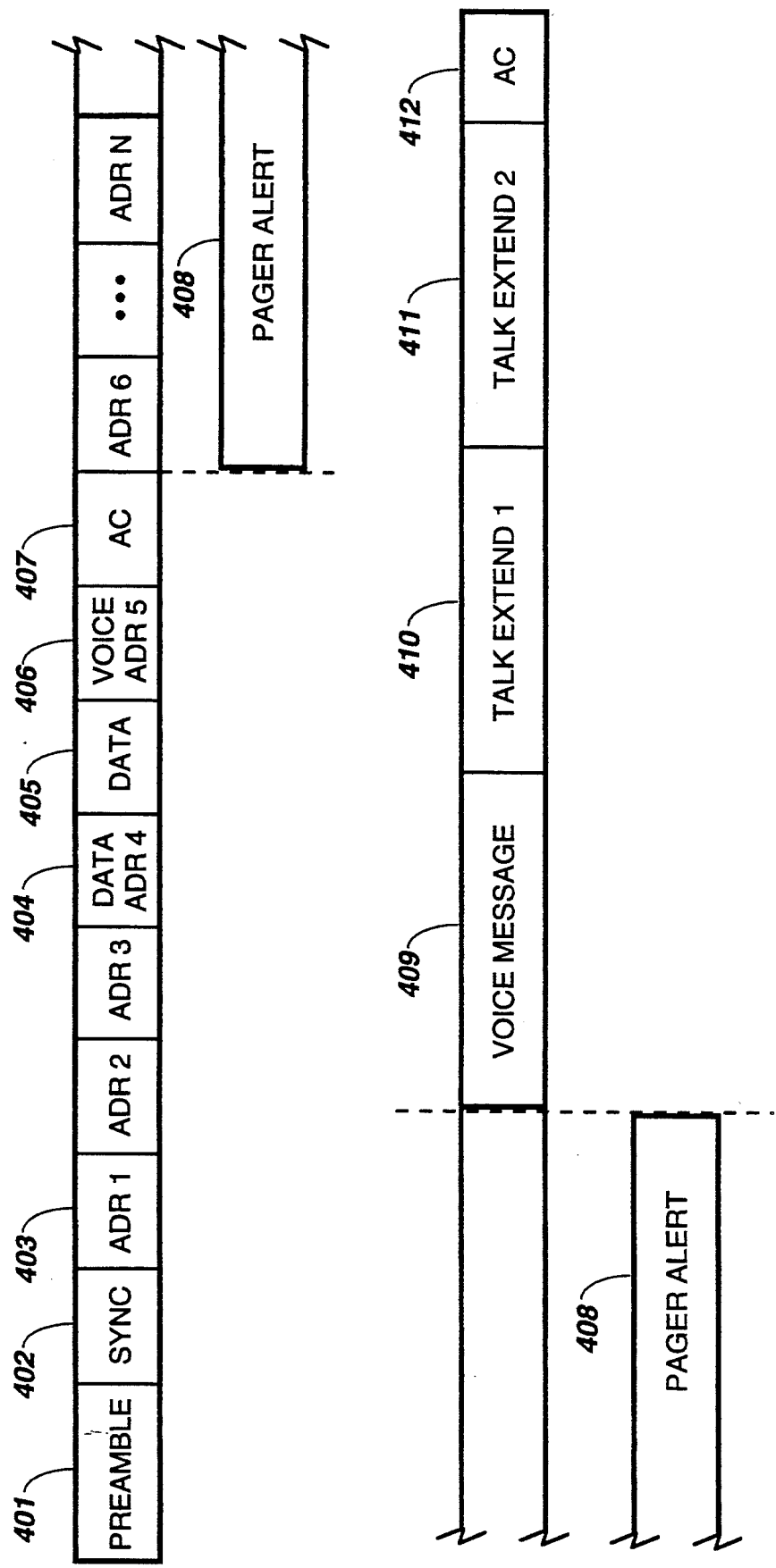
FIG. 4 illustrates an exemplary messaging protocol used by the paging terminal to effect messaging in accordancer with the preferred embodiment of the present invention.

Referring to FIG. 4, the illustration depicts an exemplary messaging protocol used by the paging terminal to effect messaging in accordance with the preferred embodiment of the present invention. A typical paging batch comprises a preamble 401, synchronization codeword 402, a tone-only selective call receiver address 403, a data selective call receiver address 404 and its associated data 405, a voice selective call receiver address 406, a first voice activation code 407, a first segment of an audio portion (voice message) 409, a second segment of the audio portion (talk extend 1) 410, a third segment of the audio portion (talk extend 2) 411, and a second activation code 412.

For purposes of illustrating the intention, it is convenient to model message delivery in three portions: a first portion containing the selective call address 406 and a first activation code 407; a second portion containing the first and subsequent segments of the audio portion 409, 410, 411; and a third portion of the paging message containing the second activation code 412. Operationally, when a voice paging message is sent to the selective call receiver, the first portion is broadcast, followed by a predetermined wait time during which the pager alerts 408. Subsequent to cessation of the alert, the second portion is broadcast to the selective call receiver. This portion acts to convey the voice message and any messaging extensions. Finally, the third portion is broadcast to the selective call receiver. The second activation code 412 acts to toggle the selective call receiver's audio from an on state to an off state, thereby muting any communications or channel noise following the selective call message transmission.

Alternatively, an optional data portion may be included in the first portion between the selective call address and the first activation code. This enables the originator to enclose a numeric or alphanumeric data message in addition to the voice message.

Figure 5:
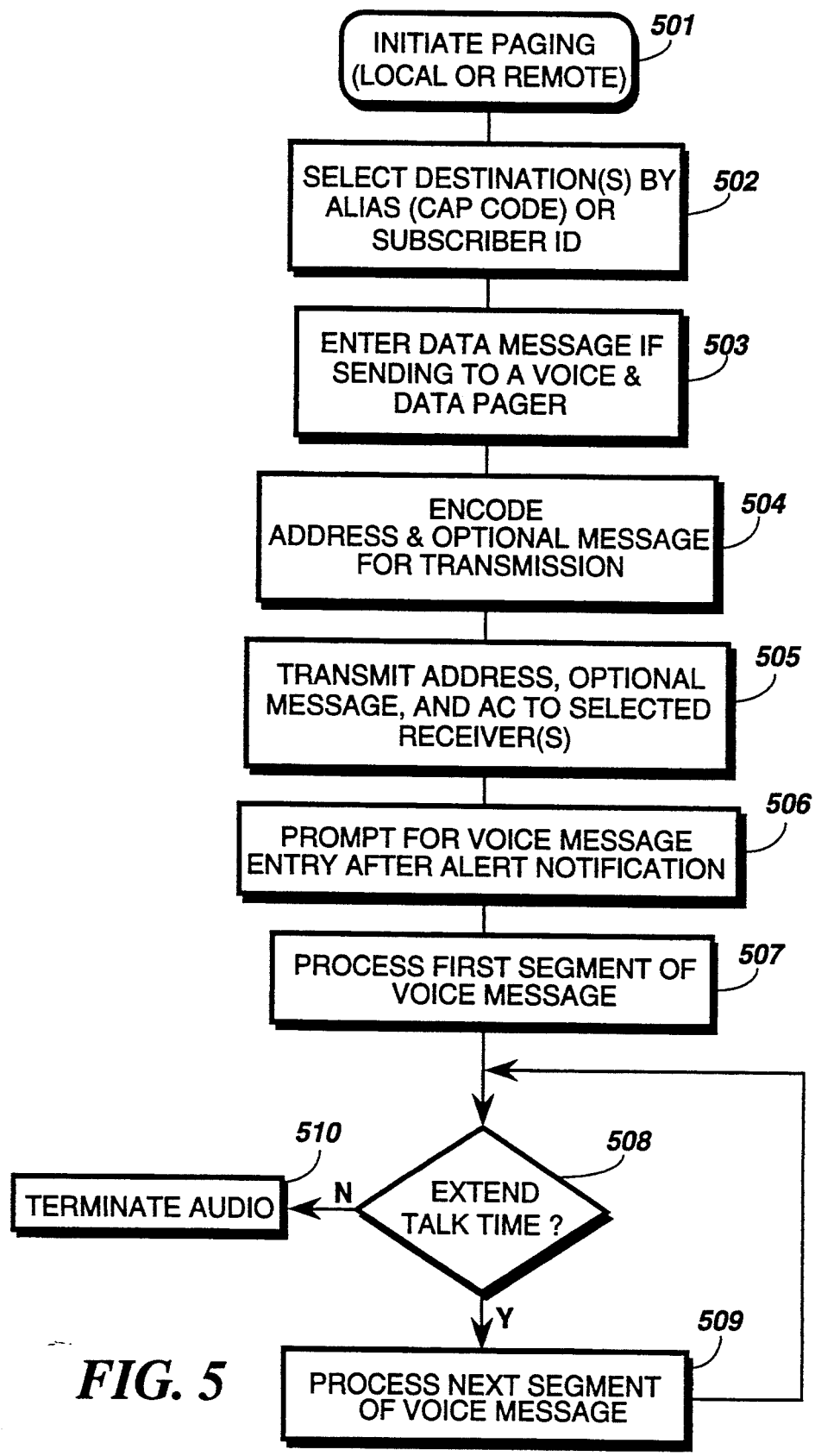
FIGS. 5 and 6 are exemplary flow diagrams illustrating a preferred method of operation for a portable paging system in accordance with the preferred embodiment of the present invention.
Figure 6:
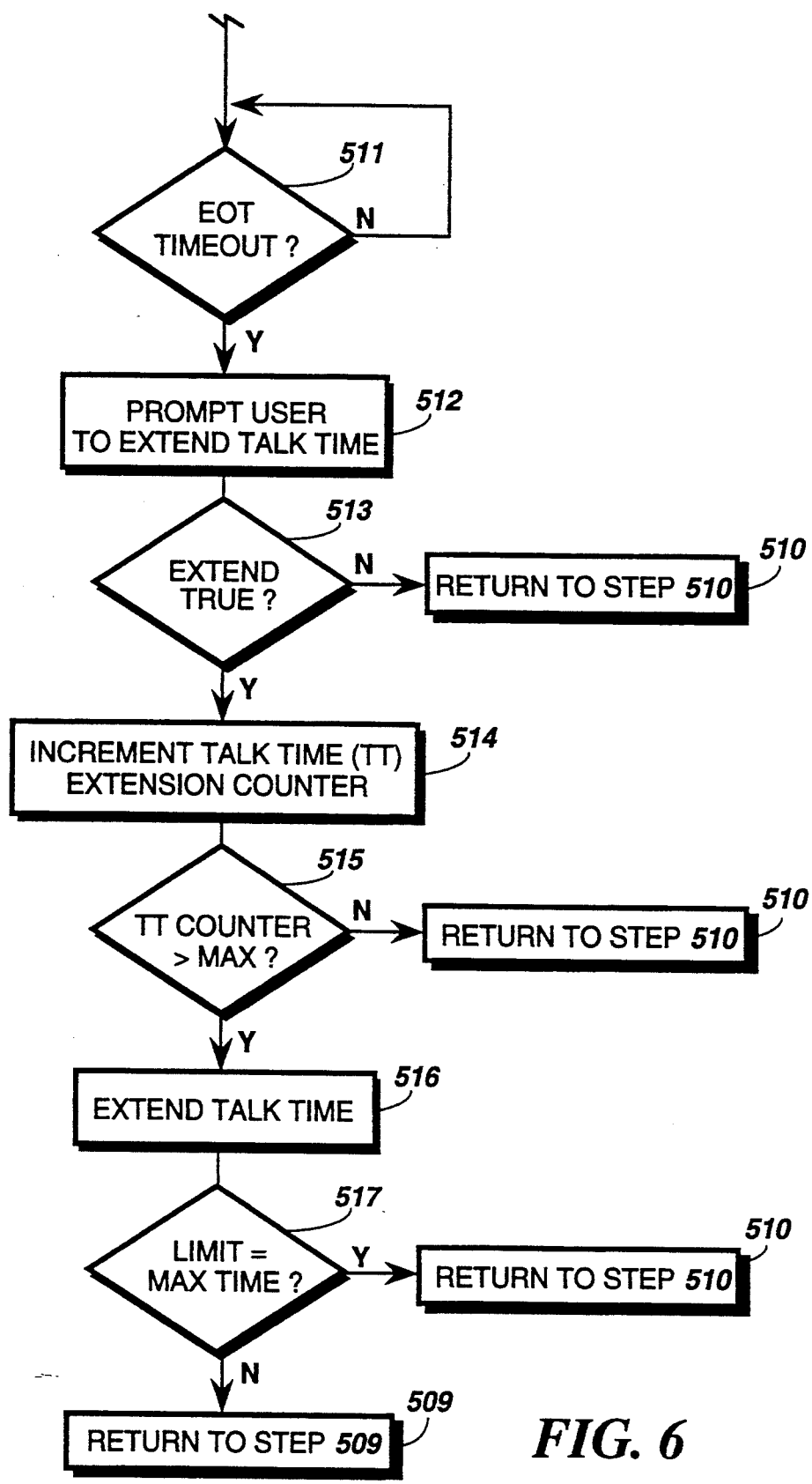

Referring to FIG. 5 and FIG. 6, the flow diagrams illustrate a preferred method of operation for the portable paging system in accordance with the preferred embodiment of the present invention. In initiating a page, 501 a user or originator selects at least one messaging subscriber as a destination for their message 502 using an alias (paging cap-code or the like) or subscriber identification. The originator then optionally enters any data (numeric, alphanumeric, etc.) to be contained in the message 503 if the message is being sent to a pager capable of receiving a combination voice and data message. The paging terminal then determines an address corresponding to the alias or subscriber identification and encodes the address along with the optional data message for transmission 504. Having encoded the address and optionally encoded a data message for transmission, the paging terminal operates to communicate at least the selective call address, the at least one optional message, and a first activation code (AC), as a first portion of the paging message, to a transmitter for broadcast 505. The activation code acts to enable the audio section of the selective call receiver so that the selected receiver can aurally present a transmitted audio message. After the transmitter broadcasts the selective call signal to the selective call receiver, the input device prompts the originator to begin entry of a second portion of the paging message including a first segment of an audio portion 506. The originator enters the first segment of the audio portion that is processed 507 by the paging terminal then broadcast by the transmitter base station 226 or the like.

At a first predetermined time 511, the input device prompts the originator that time is running out for their audio (voice) transmission 512. The first predetermined time may be programmed in the system memory 232 at manufacture, or may be dynamically altered by user initiated field programming. Preferably, the first predetermined time is selected to allow the originator enough time to respond whether they wish to continue transmission. If the originator does nothing (e.g., the originator did not request the extension of the second portion), the paging message is terminated 510 upon expiration of the first segment of the audio portion. Alternatively, if the originator requests a talk time extension 513, the next segment of the voice message is processed subject to the following conditions: the extension of the second portion of the paging message does not exceed a predetermined number of extension requests 514, 515; and does not exceed a predetermined total broadcast time allocated for the second portion of the paging message 517. The predetermined number of extension requests is a system parameter that is user selectable. Typically, the number of requests (or extensions) might default to three (assuming a total time of 15 seconds per requested extension) giving a total talk time of one minute (15 seconds associated with the initial paging message then three times 15 seconds, or 45 seconds of extension, for a total air time of 60 seconds). Depending on the system loading, one may desire to increase or decrease the number of requests allowed. Similarly, the predetermined total broadcast time allocated for the second portion of the paging message is selected to maximize utilization of system resources. This variable, in conjunction with the number of extension requests, can act to control the total air time allocated to any transmission.

By example, assume a predetermined total broadcast time of 40 seconds, a predetermined number of extension requests of two (each being 15 seconds in duration), and a first predetermined time of 10 seconds. Upon originating a message, the originator would begin talking, then at t=10 seconds, a "talk-time" extend message (e.g., a flashing light, alpha, or other like indication) would prompt the originator to request an extension. Assuming an affirmative response (e.g., the originator selects an "extend" button or the like between t=10 and t=15 seconds), the originator has used one extension and now has 30 seconds of total talk time available. At 10 seconds into the first extension, the originator is again prompted to request an additional extension. Again assuming an affirmative response (e.g., the originator selects "extend" between t=25 and t=30 seconds), the originator has used two extensions and now has 45 seconds of total talk time available. But wait, since the predetermined total broadcast time is set at 40 seconds, the user actually has only 10 more seconds of talk time after the first talk time extension period. As illustrated by this example, this system and method allows a system administrator extreme flexibility in configuring the voice paging parameters to optimize system use as well as providing system users with the convenience of extendible talk times.

Once the talk time has been extended 516, the paging terminal controller, after insuring that the instant extension will not allow the originator to exceed the predetermined total broadcast time allocated for the second portion of the paging message, processes the next segment of the voice message 509.

The paging message is terminated by broadcasting the third portion of the paging message having a second activation code. Termination occurs under three conditions: expiration of the first segment of the audio portion when the originator did not request the extension of the second portion 513, 510; exceeding the predetermined number of extension requests 515, 510; and exceeding the predetermined total broadcast time allocated for the second portion of the paging message 517, 510.

As can be appreciated by one of ordinary skill in the art, this invention can be realized in a number of embodiments of which the disclosed embodiment is only one of many equivalent alternatives.

What is claimed is:

1. In a portable paging system for communicating a paging message to a selective call receiver, the paging message including a first portion comprising at least a selective call address and a first activation code, and a second portion comprising a first segment of an audio portion; a method for selectably extending the audio portion of the paging message comprises the steps of:

prompting an originator to request an extension of the second portion of the paging message, the extension including at least a second segment of the audio portion; and extending the second portion of the paging message when the originator affirmatively requests the extension thereof and the extension of the second portion of the paging message:

does not exceed a predetermined number of extension requests; and does not exceed a predetermined total broadcast time allocated for the second portion of the paging message.

2. The method for selectably extending the audio portion of the paging message according to claim 1 comprising the step of:

terminating the paging message by broadcasting a third portion of the paging message comprising a second activation code to the selective call receiver.

3. The method for selectably extending the audio portion of the paging message according to claim 2 wherein the paging message is terminated upon an expiration of the first segment of the audio portion when the originator did not request the extension of the second portion.

4. The method for selectably extending the audio portion of the paging message according to claim 2 wherein the paging message is terminated upon exceeding the predetermined number of extension requests.

5. The method for selectably extending the audio portion of the paging message according to claim 2 wherein the paging message is terminated upon exceeding the predetermined total broadcast time allocated for the second portion of the paging message.

6. In a portable paging system for communicating a paging message to a selective call receiver, a method for selectably extending an audio portion of the paging message comprising the steps of:
   broadcasting a first portion of the paging message, the first portion comprising at least a selective call address and a first activation code to the selective call receiver;
   prompting an originator, subsequent to broadcasting the first portion of the paging message, to begin entry of a second portion of the paging message including a first segment of the audio portion;
   broadcasting the second portion of the paging message to the selective call receiver;
   prompting the originator to request an extension of the second portion of the paging message, the extension including at least a second segment of the audio portion;
   extending the second portion of the paging message when the originator affirmatively requests the extension thereof and the extension of the second portion of the paging message:
      does not exceed a predetermined number of extension requests; and
      does not exceed a predetermined total broadcast time allocated for the second portion of the paging message.

7. The method for selectably extending the audio portion of the paging message according to claim 6 comprising the step of:
   terminating the paging message by broadcasting a third portion of the paging message comprising a second activation code to the selective call receiver, termination being responsive to at least one of:
      an expiration of the first segment of the audio portion when the originator did not request the extension of the second portion;
      exceeding the predetermined number of extension requests; and
      exceeding the predetermined total broadcast time allocated for the second portion of the paging message.

8. In a portable paging system for communicating a paging message to a selective call receiver, a method comprising the steps of:
   selecting at least one messaging subscriber;
   determining a selective call address corresponding to a selected at least one messaging subscriber;
   entering an optional data portion of the at least one message to be broadcast to the selected at least one messaging subscriber,
   communicating at least the selective call address, a first activation code, and the at least one optional message as a first portion of the paging message to a transmitter for broadcast to the selective call receiver;
   broadcasting the first portion of the paging message to the selective call receiver;
   prompting an originator, subsequent to broadcasting the first portion of the paging message, to begin entry of a second portion of the paging message including a first segment of an audio portion;
   broadcasting the second portion of the paging message to the selective call receiver;
   prompting the originator to request an extension of the second portion of the paging message, the extension including at least a second segment of the audio portion;
   extending the second portion of the paging message when the originator affirmatively requests the extension thereof and the extension of the second portion of the paging message:
      does not exceed a predetermined number of extension requests; and
      does not exceed a predetermined total broadcast time allocated for the second portion of the paging message; and
   terminating the paging message in response to:
      an expiration of the first segment of the audio portion when the originator did not request the extension of the second portion;
      exceeding the predetermined number of extension requests; and
      exceeding the predetermined total broadcast time allocated for the second portion of the paging message;
      wherein the paging message is terminated by broadcasting a third portion of the paging message comprising a second activation code to the selective call receiver.

9. A portable paging system for communicating a paging message to a selective call receiver, the paging message including a first portion comprising at least a selective call address and a first activation code, and a second portion comprising a first segment of an audio portion, the portable paging system comprising:
   an input device for prompting an originator to request an extension of the second portion of the paging message, the extension including at least a second segment of the audio portion; and
   a paging terminal controller that extends the second portion of the paging message when the originator affirmatively requests the extension thereof and the extension of the second portion of the paging message:
      does not exceed a predetermined number of extension requests; and
      does not exceed a predetermined total broadcast time allocated for the second portion of the paging message.

10. The portable paging system according to claim 9 wherein the paging terminal controller terminates the paging message by broadcasting a third portion of the paging message comprising a second activation code to the selective call receiver.

11. The portable paging system according to claim 9 wherein the paging terminal controller terminates the paging message upon an expiration of the first segment of the audio portion when the originator did not request the extension of the second portion.

12. The portable paging system according to claim 9 wherein the paging terminal controller terminates the paging message upon exceeding the predetermined number of extension requests.

13. The portable paging system according to claim 9 wherein the paging terminal controller terminates the paging message upon exceeding the predetermined total broadcast time allocated for the second portion of the paging message.

* * * * *